No. 680,063. Patented Aug. 6, 1901.
J. S. MONTGOMERY, F. G. OWEN & R. R. OWEN, Jr.
BELT PLACER.
(Application filed Apr. 18, 1901.)
(No Model.)
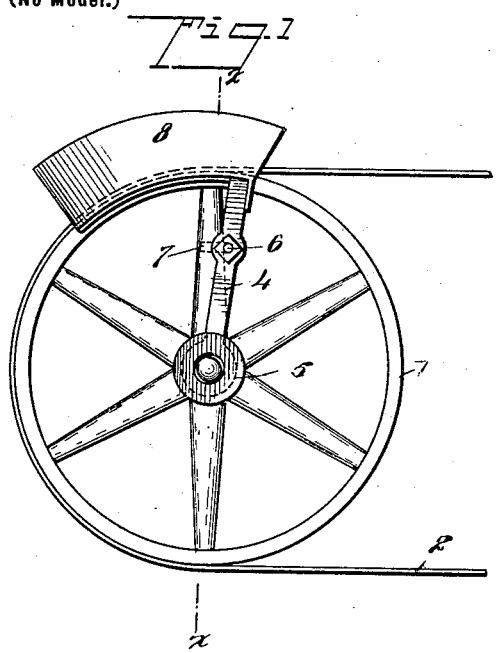
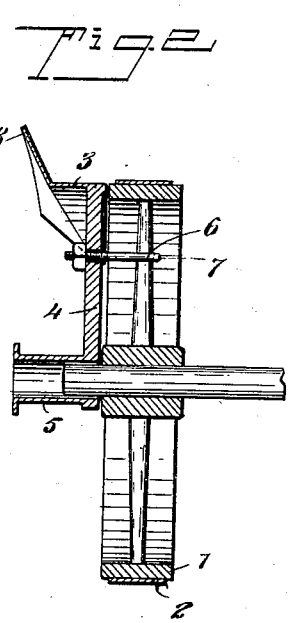
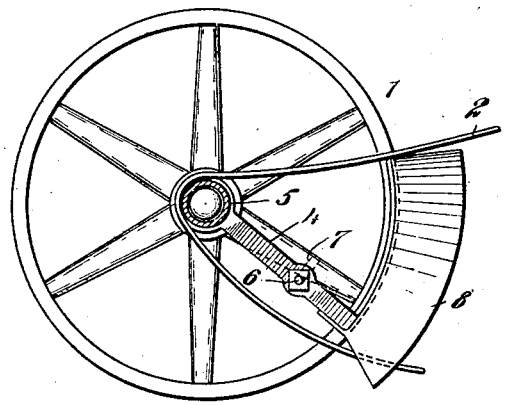
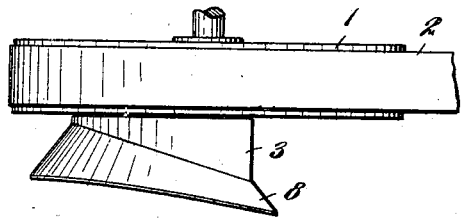
WITNESSES:
J A Brophy
C R Ferguson
INVENTORS
Jordan S. Montgomery
Felix G. Owen
Robert R. Owen, Jr.
BY
ATTORNEYS

UNITED STATES PATENT OFFICE.

JORDAN S. MONTGOMERY, FELIX G. OWEN, AND ROBERT R. OWEN, JR., OF FRANKLIN, KENTUCKY.

BELT-PLACER.

SPECIFICATION forming part of Letters Patent No. 680,063, dated August 6, 1901.

Application filed April 18, 1901. Serial No. 56,456. (No model.)

*To all whom it may concern:*

Be it known that we, JORDAN S. MONTGOMERY, FELIX G. OWEN, and ROBERT R. OWEN, Jr., citizens of the United States, and residents of Franklin, in the county of Simpson and State of Kentucky, have invented a new and Improved Belt-Placer, of which the following is a full, clear, and exact description.

This invention relates to improvements in devices for placing driving-belts on pulleys, the object being to provide a simple device of this character especially adapted for the placing of long, heavy, and horizontally-running belts, such as a belt for a threshing-machine or the like driven from an engine, and, further, to so construct the device that it may be readily attached or detached.

We will describe a belt-placer embodying our invention and then point out the novel features in the appended claims.

Reference is to be had to the accompanying drawings, forming a part of this specification, in which similar characters of reference indicate corresponding parts in all the figures.

Figure 1 is a side view of a pulley, showing a belt-placer embodying our invention applied thereto. Fig. 2 is a section on the line $xx$ of Fig. 1. Fig. 3 is a side view showing the belt off the pulley, and Fig. 4 is a plan view of the pulley and the belt-placer.

Referring to the drawings, 1 designates a driving-pulley, and 2 the driving-belt.

The belt-placer consists of a segmental plate 3, connected to an arm 4, having a tubular hub portion 5, designed to loosely fit upon the projected end of the pulley-shaft, as clearly illustrated in Fig. 2, and it may be held in position on the pulley by means of a bolt 6 passing through the arm and having at one end a hook portion 7 for engaging around a spoke of the pulley. This plate 3 is gradually tapered or gradually decreases in width from one end to the other, and at the outer edge is an upwardly and outwardly extended flange 8.

In operation when it is desired to place a belt on a pulley the belt-placer is to be attached as shown, and then upon a rotation of the pulley the band will first engage with the wider portion of the plate 3, and as the pulley rotates the flange 8 will force the belt over and upon the pulley. After placing the belt the placer may be readily removed by loosening the nut on the threaded portion of the bolt 6.

Having thus described our invention, we claim as new and desire to secure by Letters Patent—

1. A belt-placer, comprising a segmental plate gradually diminishing in width from one end to the other and provided with an upwardly-projecting flange on its outer edge, an arm to which the plate is secured, a hub on the inner end of the arm and adapted to loosely fit upon the end of a pulley-shaft, and means for detachably securing the arm to the pulley, as set forth.

2. A belt-placer, comprising a segmental plate diminishing in width from one end to the other, an upwardly and outwardly extended flange on the outer edge of said plate, an arm to which the said plate is attached, a tubular hub on the arm, adapted to fit loosely upon the shaft of a pulley, and a hook-bolt extended through the arm and adapted to engage with a spoke of the pulley, the bolt being threaded and provided with a nut, substantially as specified.

In testimony whereof we have signed our names to this specification in the presence of two subscribing witnesses.

JORDAN S. MONTGOMERY.
FELIX G. OWEN.
ROBERT R. OWEN, JR.

Witnesses:
JOHN D. FLOWERS,
J. H. IRVINGTON.